US011991356B2

(12) United States Patent
Iwamura et al.

(10) Patent No.: US 11,991,356 B2
(45) Date of Patent: *May 21, 2024

(54) DEBLOCKING FILTER CONTROL DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,785

(22) Filed: Jan. 27, 2023

(65) Prior Publication Data

US 2023/0179765 A1 Jun. 8, 2023

Related U.S. Application Data

(63) Continuation of application No. 17/655,745, filed on Mar. 21, 2022, now Pat. No. 11,595,645, which is a (Continued)

(30) Foreign Application Priority Data

Apr. 2, 2020 (JP) ................................. 2020-067043

(51) Int. Cl.
*H04N 19/117* (2014.01)
*H04N 19/146* (2014.01)
(Continued)

(52) U.S. Cl.
CPC ......... *H04N 19/117* (2014.11); *H04N 19/146* (2014.11); *H04N 19/184* (2014.11); *H04N 19/82* (2014.11)

(58) Field of Classification Search
CPC .......................... H04N 19/117; H04N 19/146
(Continued)

(56) References Cited

U.S. PATENT DOCUMENTS 11,595,645 B2 2/2023 Iwamura et al.
2014/0233659 A1 8/2014 Narroschke et al.
(Continued)

FOREIGN PATENT DOCUMENTS

JP 7080424 B2 6/2022
KR 10-2018-0061069 A 6/2018
WO 2013/064654 A1 5/2013

OTHER PUBLICATIONS

International Search Report issued in PCT/JP2021/014144; dated Jun. 29, 2021.

(Continued)

*Primary Examiner* — Amir Shahnami
(74) *Attorney, Agent, or Firm* — Studebaker & Brackett PC

(57) ABSTRACT

A deblocking filter control device that controls a deblocking filter process performed on a decoded image includes: a parameter deriver configured to derive a parameter value that controls a filter strength in the deblocking filter process; and a parameter transformer configured to output a transformed parameter value by transforming the parameter value based on an input bit depth that is a bit depth of the video signal, wherein when the input bit depth is smaller than a predetermined bit depth, the parameter transformer is configured to output the transformed parameter value by adding an offset value to the parameter value and making a bit shift of a result of the addition, and the parameter transformer is configured to change the offset value based on the input bit depth.

6 Claims, 4 Drawing Sheets

Related U.S. Application Data continuation of application No. PCT/JP2021/014144, filed on Apr. 1, 2021.

(51) Int. Cl.
*H04N 19/184* (2014.01)
*H04N 19/82* (2014.01)

(58) Field of Classification Search
USPC .................................................. 375/240.02
See application file for complete search history.

(56) References Cited

U.S. PATENT DOCUMENTS

| | | | |
|---|---|---|---|
| 2015/0016516 A1 | 1/2015 | Saxena et al. | |
| 2015/0071340 A1* | 3/2015 | Andersson | H04N 19/463 375/240.02 |
| 2019/0116358 A1* | 4/2019 | Zhang | H04N 19/117 |
| 2019/0268594 A1 | 8/2019 | Lim et al. | |
| 2021/0195227 A1 | 6/2021 | Lee et al. | |

OTHER PUBLICATIONS

Written Opinion of the International Searching Authority issued in PCT/JP2021/014144; dated Jun. 29, 2021.

Benjamin Bross et al. "Versatile Video Coding (Draft 8)" Joint Video Experts Team (JVET) of ITU-T SG 16 WP 3 and ISO/IEC JTC 1/SC 29/WG 11, 17th Meeting; JVET-Q2001-v8; Jan. 7-17, 2020; pp. 1-497; Brussels, Belgium.

Benjamin Bross et al. "Versatile Video Coding (Draft 8)" Joint Video Experts Team (JVET) of ITU-T SG 16 WP 3 and ISO/IEC JTC 1/SC 29/WG 11, 17th Meeting; JVET-Q2001-vE; Jan. 7-17, 2020; pp. 1-10; Brussels, Belgium.

K. Andersson et al. "Non-CE5: Deblocking tC Table Defined for 10-bit Video" Joint Video Experts Team (JVET) of ITU-T SG 16 WP 3 and ISO/IEC JTC 1/SC 29/WG 11, 15th Meeting; JVET-O0159; Jul. 3-12, 2019; pp. 1-6; Gothenburg, Sweden.

Shunsuke Iwamura et al. "Cleanup of tC Value Derivation Process for Deblocking Filter" Joint Video Experts Team (JVET) of ITU-T SG 16 WP 3 and ISO/IEC JTC 1/SC 29/WG 11, 18th Meeting; JVET-R0130; Apr. 15-24, 2020; pp. 1-6; teleconference.

* cited by examiner

DEBLOCKING FILTER CONTROL DEVICE AND PROGRAM

RELATED APPLICATIONS

The present application is a continuation of U.S. patent application Ser. No. 17/655,745, filed on Mar. 21, 2022, which is a continuation based on PCT Application No. PCT/JP2021/014144, filed on Apr. 1, 2021, which claims the benefit of Japanese Patent Application No. 2020-067043 filed on Apr. 2, 2020. The content of which is incorporated by reference herein in their entirety.

TECHNICAL FIELD

The present invention relates to a deblocking filter control device and a program.

BACKGROUND ART

In video encoding schemes, block distortion may occur in a decoded image in some cases because an original image is divided into blocks, and a prediction process, a transform process, and a quantization process are applied on a divided block basis. Accordingly, in video encoding schemes such as HEVC (High Efficiency Video Coding) and/or a VVC (Versatile Video Coding) specification draft (hereinafter, VVC) described in Non Patent Literature 1, a deblocking filter is introduced that mitigates block distortion by applying an in-loop filter process to a decoded image.

Application control of the deblocking filter in HEVC and/or VVC is performed with respect to each boundary between blocks on which the transform process is to be performed (blocks to be transformed), depending on pixel values in an area near the boundary in a decoded image prior to a deblocking filter process and a quantization parameter applied to the blocks to be transformed straddling the boundary, and the like. One of parameter values that control filter strength in such a deblocking filter process is "$t_C$".

In HEVC, since a main encoding target is a video signal with a bit depth of 8 bits, a table of $t_C$ values corresponding to the quantization parameter QP defined in HEVC stores values corresponding to the video signal with a bit depth of 8 bits. In VVC, on the other hand, values corresponding to a 10-bit video signal are defined in a $t_C$ table because a main encoding target is a video signal with a bit depth of 10 bits.

In VVC, since the $t_C$ table corresponding to the 10-bit video signal is defined for the deblocking filter process as described above, when the bit depth of an encoding-target video is not 10 bits, a transform process on $t_C$ is performed based on the bit depth of the input video. Specifically, Non Patent Literature 1 describes that the transform process is performed by making a bit shift and an offset, as indicated by the following expression.

$t_C$=BitDepth<10?($t_C$'+2)>>(10−BitDepth):$t_C$'×(1<<(BitDepth−10))

In the above, "BitDepth" is the bit depth of an input video, "$t_C$'" is $t_C$ prior to transformation, ">>" indicates an arithmetic right shift, and "<<" indicates an arithmetic left shift. The above transform expression means that when the bit depth of an input video is less than 10 bits, $t_C$ after transformation is calculated as $t_C$=($t_C$'+2)>>(10−BitDepth), and when the bit depth of an input video is equal to or more than 10 bits, $t_C$ after transformation is calculated as $t_C$=$t_C$'×(1<<(BitDepth−10)).

CITATION LIST

Non Patent Literature

Non Patent Literature 1: JVET-Q2001 "Versatile Video Coding (Draft 8)"

DISCLOSURE OF INVENTION

A deblocking filter control device according to a first feature controls a deblocking filter process performed on a decoded image, in an encoding device that encodes a video signal or a decoding device that decodes an encoded video signal. The deblocking filter control device includes: a parameter deriver configured to derive a parameter value that controls a filter strength in the deblocking filter process; and a parameter transformer configured to output a transformed parameter value by transforming the parameter value based on an input bit depth that is a bit depth of the video signal, wherein when the input bit depth is smaller than a predetermined bit depth, the parameter transformer is configured to output the transformed parameter value by adding an offset value to the parameter value and making a bit shift of a result of the addition, and the parameter transformer is configured to change the offset value based on the input bit depth.

A program according to a second feature causes a computer to function as the deblocking filter control device according to the first feature.

DESCRIPTION OF EMBODIMENTS

As a result of studious review, the inventors of the present application have found a problem that the transform expression according to Non Patent Literature 1 does not properly work under a predetermined condition. With the transform expression according to Non Patent Literature 1, an appropriate transform process cannot be performed particularly when the bit depth of an input video is 9 bits, and there is, therefore, concern that pixel values may be corrected by the unintended deblocking filter process, and deterioration may be caused in the video.

Accordingly, an object of the present disclosure is to make it possible to appropriately control the deblocking filter process, according to the bit depth of an input video.

An encoding device and a decoding device according to an embodiment are described with reference to the accompanying drawings. The encoding device and the decoding device according to the embodiment encode and decode videos such as MPEG (Moving Picture Experts Group) videos. In the description of the drawings below, the same or similar reference signs are used for the same or similar parts.

<Encoding Device>

Figure 1:
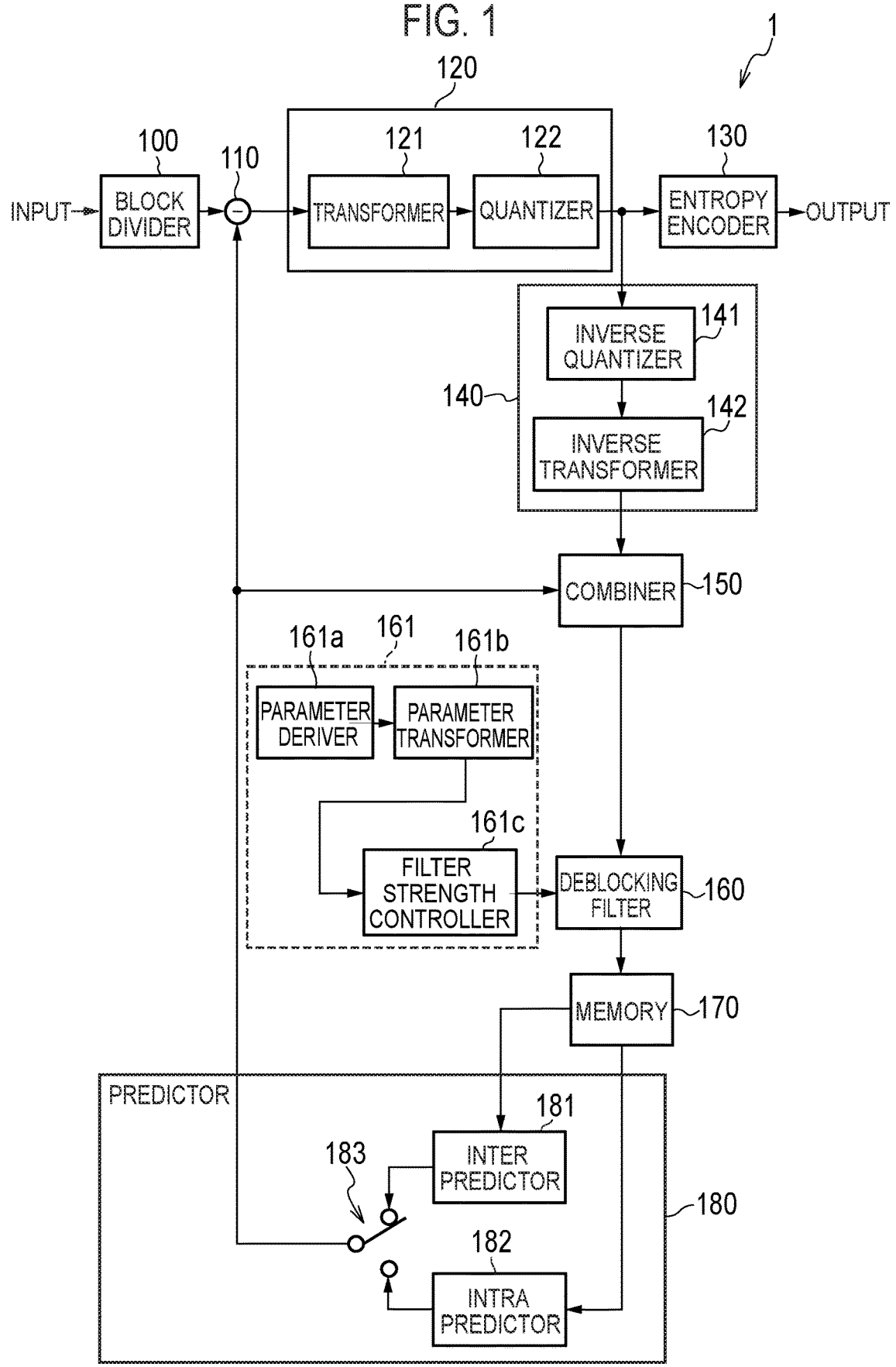
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment. The encoding device 1 is a device that performs encoding on each of blocks obtained by dividing an image.

As illustrated in FIG. 1, the encoding device 1 includes a block divider 100, a subtractor 110, a transformer/quantizer 120, an entropy encoder 130, an inverse quantizer/inverse transformer 140, a combiner 150, a deblocking filter 160, a deblocking filter control device 161, a memory 170, and a predictor 180.

The block divider 100 divides an input image given in the form of a frame (or a picture) that constitutes a part of a video into a plurality of image blocks and outputs the resulting image blocks to the subtractor 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

It is assumed that the bit depth of a video signal inputted into the block divider 100 (hereinafter, referred to as "input bit depth") is basically 10 bits. However, the input bit depth can be changed within a range of 8 bits to 14 bits. A value indicating the input bit depth (the number of bits) may be outputted from the block divider 100 to the deblocking filter control device 161, or may be outputted from a functional unit (so-called preprocessor) prior to the block divider 100 to the deblocking filter control device 161.

The block divider 100 performs block division on a luminance signal and a chrominance signal. A luminance block and a chrominance block are simply referred to as an encoding-target block when the blocks are not particularly distinguished from each other.

The subtractor 110 calculates prediction residuals that represent differences (errors) between an encoding-target block outputted from the block divider 100 and a prediction block obtained by the predictor 180 predicting the encoding-target block. The subtractor 110 calculates a prediction residual by subtracting each pixel value in the prediction block from each pixel value in the block, and outputs the calculated prediction residuals to the transformer/quantizer 120.

The transformer/quantizer 120 executes a transform process and a quantization process on each of blocks. The transformer/quantizer 120 includes a transformer 121 and a quantizer 122.

The transformer 121 calculates transform coefficients for each frequency component by performing a transform process on the prediction residual outputted from the subtractor 110 and outputs the calculated transform coefficients to the quantizer 122. The transform process (transformation) is a process of transforming a pixel-domain signal into a frequency-domain signal and includes, for example, discrete cosine transform (DCT), discrete sine transform (DST), Karhunen Loeve transform (KLT), an integer transform based on any one of such transforms, or the like. The transform process may include transform skip in which adjustment is performed by scaling or the like, without transforming a pixel-domain signal into a frequency-domain signal.

The quantizer 122 quantizes the transform coefficients outputted from the transformer 121 by using a quantization parameter and a quantization matrix, and outputs the quantized transform coefficients to the entropy encoder 130 and the inverse quantizer/inverse transformer 140. Moreover, the quantizer 122 outputs information related to the quantization process (specifically, information on the quantization parameter and the quantization matrix used in the quantization process) to the entropy encoder 130, the inverse quantizer 141, and the deblocking filter control device 161.

Here, the quantization parameter is a parameter where one value of which is set for one block. Specifically, the quantization parameter is a parameter that is applied in common to each transform coefficient in a block, and is a parameter that determines quantization granularity (step size). The quantization matrix is a matrix including values that are set for each component in one block. Specifically, the quantization matrix is a matrix including values (weighted coefficients) that are set for each component including i×j elements depending on a block size, and is used to adjust the quantization granularity for each of the components ranging from low to high frequencies of the transform coefficients.

The entropy encoder 130 performs entropy encoding on the transform coefficients outputted from the quantizer 122, generates an encoded stream (bit stream) by performing data compression, and outputs the encoded stream to an outside of the encoding device 1. For the entropy encoding, Huffman coding and/or CABAC (Context-based Adaptive Binary Arithmetic Coding) or the like can be used.

Moreover, the entropy encoder 130 acquires information on the size, the shape and the like of each encoding-target block and the bit depth from the block divider 100, acquires the information related to the quantization process from the quantizer 122, acquires information related to prediction (for example, information on a prediction mode and a motion vector) from the predictor 180, and also performs encoding on the information.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the transform coefficients outputted from the quantizer 122 by using the quantization parameter and the quantization matrix to restore the transform coefficients, and outputs the restored transform coefficients to the inverse transformer 142.

The inverse transformer 142 performs the inverse transform process corresponding to the transform process performed by the transformer 121. For example, when the transformer 121 performs DCT, the inverse transformer 142 performs inverse DCT. The inverse transformer 142 restores the prediction residual by performing the inverse transform process on the transform coefficients outputted from the inverse quantizer 141 and outputs a restoration prediction residual that is the restored prediction residual to the combiner 150.

The combiner 150 combines the restoration prediction residual outputted from the inverse transformer 142 with a prediction block outputted from the predictor 180, on a pixel-by-pixel basis. The combiner 150 reconstructs (decodes) an encoding-target block by adding individual pixel values of the restoration prediction residual to individual pixel values of the prediction block and outputs a decoded image (reconstructed block) on each of reconstructed blocks to the deblocking filter 160.

The deblocking filter 160 performs a filter process for the block boundary between two blocks including a reconstructed block and an adjacent block that is adjacent to the reconstructed block, and outputs the reconstructed block after the filter process to the memory 170. The filter process is a process for mitigating signal deterioration caused by the block-based processes, and is a filter process of smoothing a signal gap at the block boundary between two adjacent blocks. The deblocking filter 160 is configured, in general, as a low-pass filter that makes signal changes more gradual.

Figure 2:
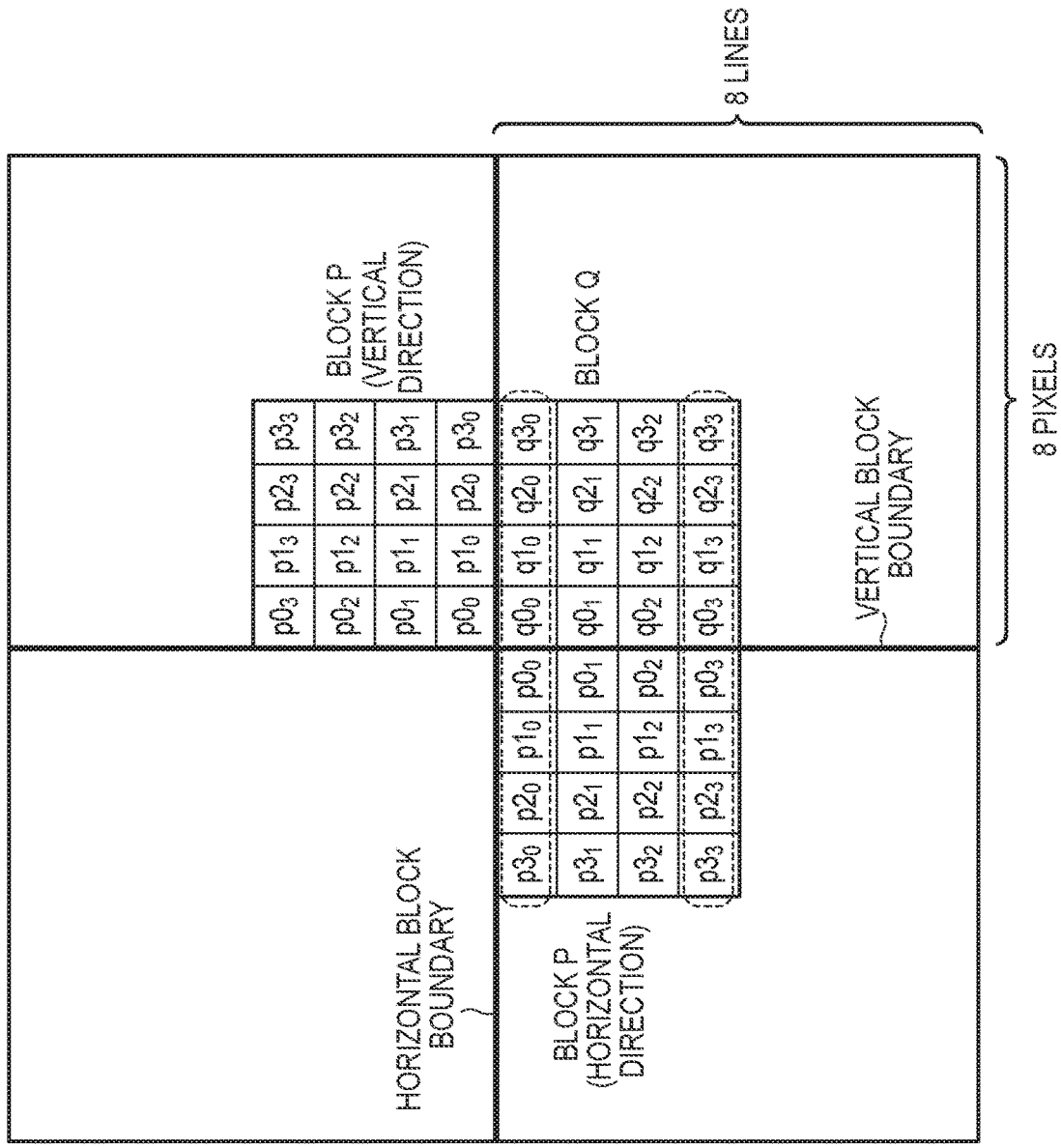
FIG. 2 is a diagram illustrating an example of operation of a deblocking filter according to the embodiment.

FIG. 2 is a diagram illustrating an example of operation of the deblocking filter 160 according to the present embodiment. In the example illustrated in FIG. 2, although an example is illustrated in which the deblocking filter 160 performs the filter process for the block boundary of each 8×8 pixel block, the deblocking filter 160 may perform the filter process for a block boundary of each 4×4 pixel block. The deblocking filter 160 performs the filter process on each four rows or each four columns as a unit. Referring to blocks P and Q in FIG. 2, an example is illustrated in which each of the blocks P and Q is a unit of the filter process by the deblocking filter 160, and has a block size of 4×4 pixels. Each of the blocks P and Q may be referred to also as "sub-block".

The deblocking filter control device 161 controls the deblocking filter 160. More specifically, the deblocking filter control device 161 controls boundary strength (Bs) indicating whether or not the filter process is performed on a block boundary of the target block pair, and filter strength of the deblocking filter 160. The boundary strength Bs refers to a parameter for determining whether or not the filter process is applied and a type of the filter process. Note that control of whether or not a filter process is performed can be regarded as control of whether the boundary strength Bs is set to one or more, or to zero.

The deblocking filter control device 161 controls the deblocking filter 160, based on variations of pixel values in an area near the boundary of the target block pair, the prediction mode, the quantization parameter, and values of motion vectors used in motion-compensated prediction (inter prediction).

Moreover, the deblocking filter control device 161 according to the present embodiment controls the filter strength of the deblocking filter 160, based on the input bit depth and the quantization parameter used in the quantization process and the inverse quantization process. Hereinafter, it is assumed that an encoding-target block or a sub-block of the encoding-target block is a block P, and an adjacent block or a sub-block of the adjacent block is a block Q.

The deblocking filter control device 161 determines a boundary strength Bs, for example, based on Table 1 below. It is assumed that the value of the boundary strength Bs is any one of 0, 1, 2. Note that a boundary strength may be calculated for a block of each of a luminance signal and a chrominance signal, or a combination of boundary strengths for blocks of a luminance signal and a chrominance signal may be determined as one boundary strength.

TABLE 1

| Bs value | Condition of determining Bs value |
|---|---|
| 2 | Intra prediction is applied to at least one of two blocks |
| 1 | At least one of two blocks includes non-zero coefficient |
| 1 | Numbers of motion vectors of two blocks, or reference images thereof, are different |
| 1 | Difference between motion vectors of two blocks is equal to or larger than threshold value |
| 0 | Other than the above |

As indicated in Table 1, the deblocking filter control device 161 sets the value of Bs to 2 when intra prediction is applied to at least one of the blocks P and Q.

The deblocking filter control device 161 sets the value of Bs to 1 when inter prediction is applied to both of the blocks P and Q, and when at least one condition of the following (a) to (c) is satisfied, and otherwise sets the value of Bs to 0.
 (a) At least one of the blocks P and Q includes a significant transform coefficient (that is, a non-zero coefficient).
 (b) The numbers of motion vectors of the blocks P and Q, or reference images thereof, are different.
 (c) The absolute value of a difference between motion vectors of the blocks P and Q is equal to or larger than a threshold value (for example, one pixel).

When the value of the boundary strength Bs is 0, the deblocking filter control device 161 controls the deblocking filter 160 such that the filter process is not performed for the boundary between the blocks P and Q.

The deblocking filter control device 161 includes a parameter deriver 161a. The parameter deriver 161a derives parameter values (threshold values) $\beta$ and $t_C'$ for controlling the filter strength of the deblocking filter 160, based on the quantization parameter $Qp_P$ used in the quantization process and the inverse quantization process on the block P, the quantization parameter $Qp_Q$ used in the quantization process and the inverse quantization process on the block Q, and an offset value qpOffset.

First, the parameter deriver 161a calculates a variable qP, for example, based on the following expression.

$$qP=((Qp_Q+Qp_P+1)>>1)+\text{qpOffset}$$

In the above, ">>" indicates a shift operator (arithmetic right shift). The expression is, basically, a calculation expression to obtain an average of the quantization parameter $Qp_P$ for the block P and the quantization parameter $Qp_Q$ for the block Q.

Second, the parameter deriver 161a calculates Q for deriving the parameter value $\beta$, for example, based on the following expression.

$$Q=\text{Clip3}(0,63,qP+(\text{slice\_beta\_offset\_div2}<<1))$$

In the above, "<<" indicates a shift operator (arithmetic left shift). "Clip3(X, Y, Z)" is a clip operator that returns X when Z is smaller than X, returns Y when Z is larger than Y, and otherwise returns Z. "slice_beta_offset_div2" is one of parameters to signal to a decoding device 2.

Moreover, the parameter deriver 161a calculates Q for deriving the parameter value $t_C'$, for example, based on a following expression.

$$Q=\text{Clip3}(0,65,qP+2*(bS-1)+(\text{slice\_tc\_offset\_div2}<<1))$$

Here, "bS" is a value of Bs. "slice_tc_offset_div2" is one of the parameters to signal to the decoding device 2.

Third, the parameter deriver 161a derives the parameter values $\beta$ and $t_C'$ from respectively calculated Q, based on Table 2 below.

TABLE 2

| Q | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| β' | 0 | 0 | 0 | 0 | 0 | 0 | 0 | 0 | 0 | 0 | 0 | 0 | 0 | 0 | 0 | 0 | 6 |
| $t_C'$ | 0 | 0 | 0 | 0 | 0 | 0 | 0 | 0 | 0 | 0 | 0 | 0 | 0 | 0 | 0 | 0 | 0 |

| Q | | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_C'$ | 0 | 3 | 4 | 4 | 4 | 4 | 5 | 5 | 5 | 5 | 7 | 7 | 8 | 9 | 10 | 10 | 11 |

| Q | | | | | | | | | | | | | | | | |
|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_C'$ | 13 | 14 | 15 | 17 | 19 | 21 | 24 | 25 | 29 | 33 | 36 | 41 | 45 | 51 | 57 | 64 | 71 |

| Q | | | | | | | | | | | | | | | |
|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 |
| β' | 64 | 66 | 68 | 70 | 72 | 74 | 76 | 78 | 80 | 82 | 84 | 86 | 88 | — | — |
| $t_C'$ | 80 | 89 | 100 | 112 | 125 | 141 | 157 | 177 | 198 | 222 | 250 | 280 | 314 | 352 | 395 |

Here, "$t_C$" is values corresponding to a video signal with a bit depth of 10 bits.

The deblocking filter control device 161 further includes a parameter transformer 161b. The parameter transformer 161b outputs a transformed parameter value $t_C$ by transforming the parameter value $t_C'$ based on the input bit depth. The transformed parameter value $t_C$ represents a value of $t_C'$ after the transform process is applied such that the parameter value $t_C'$ corresponds to the input bit depth.

In the present embodiment, when the input bit depth is smaller than a predetermined bit depth, the parameter transformer 161b outputs the transformed parameter value $t_C$ by adding an offset value to the parameter value $t_C'$ and making a bit shift of a result of the addition. The parameter transformer 161b changes the offset value, based on the input bit depth. Details of operation of the parameter transformer 161b will be described later.

The deblocking filter control device 161 further includes a filter strength controller 161c. The filter strength controller 161c controls the filter strength of the deblocking filter 160, based on the value of the boundary strength Bs and the parameter values β and $t_C$.

When the value of the boundary strength Bs is 1 or 2, the filter strength controller 161c may control the deblocking filter 160 such that the filter process is performed only when a following expression is satisfied (see FIG. 2).

$$|p2_0-2p1_0+p0_0|+|p2_3-2p1_3+p0_3|+|q2_0-2q1_0+q0_0|+|q2_3-2q1_3+q0_3|<\beta \quad \text{[Expression 1]}$$

Moreover, when the filter process is performed, the filter strength controller 161c may apply a stronger filter when all of following conditional expressions are satisfied, and otherwise apply a weaker filter (see FIG. 2).

$$2(|p2_0-2p1_0+p0_0|+|q2_0-2q1_0+q0_0|)<\beta/4$$

$$2(|p2_3-2p1_3+p0_3|+|q2_3-2q1_3+q0_3|)<\beta/4$$

$$|p3_0-p0_0|+|q0_0-q3_0|<\beta/8$$

$$|p3_3-p0_3|+|q0_3-q3_3|<\beta/8$$

$$|p0_0-q0_0|<(5t_C+1)/2$$

$$|p0_3-q0_3|<(5t_C+1)/2 \quad \text{[Expression 2]}$$

Referring back to FIG. 1, the memory 170 accumulates reconstructed blocks outputted from the deblocking filter 160 as decoded images in units of frames. The memory 170 outputs the stored decoded images to the predictor 180.

The predictor 180 generates a prediction block corresponding to an encoding-target block by performing a prediction process in units of the block, and outputs the generated prediction block to the subtractor 110 and the combiner 150. The predictor 180 includes an inter predictor 181, an intra predictor 182 and a switcher 183.

The inter predictor 181 calculates a motion vector through a scheme such as block matching by using, for a reference image, a decoded image stored in the memory 170, generates an inter prediction block by predicting an encoding-target block, and outputs the generated inter prediction block to the switcher 183. The inter predictor 181 selects an optimal inter prediction method, from inter prediction using a plurality of reference images (typically, bi-prediction) and inter prediction using one reference image (uni-directional prediction), and performs inter prediction by using the selected inter prediction method. The inter predictor 181 outputs information related to inter prediction (the motion vector and the like) to the entropy encoder 130 and the deblocking filter control device 161.

The intra predictor 182 selects an optimal intra prediction mode to be applied to an encoding-target block from among a plurality of intra prediction modes, and predicts the encoding-target block by using the selected intra prediction mode. The intra predictor 182 generates an intra prediction block by referencing decoded pixel values adjacent to the encoding-target block of a decoded image stored in the memory 170, and outputs the generated intra prediction block to the switcher 183. The intra predictor 182 outputs information related to the selected intra prediction mode to the entropy encoder 130 and the deblocking filter control device 161.

The switcher 183 switches the prediction block between the inter prediction block outputted from the inter predictor 181 and the intra prediction block outputted from the intra predictor 182 and outputs one of the prediction blocks to the subtractor 110 and the combiner 150.

Figure 3:
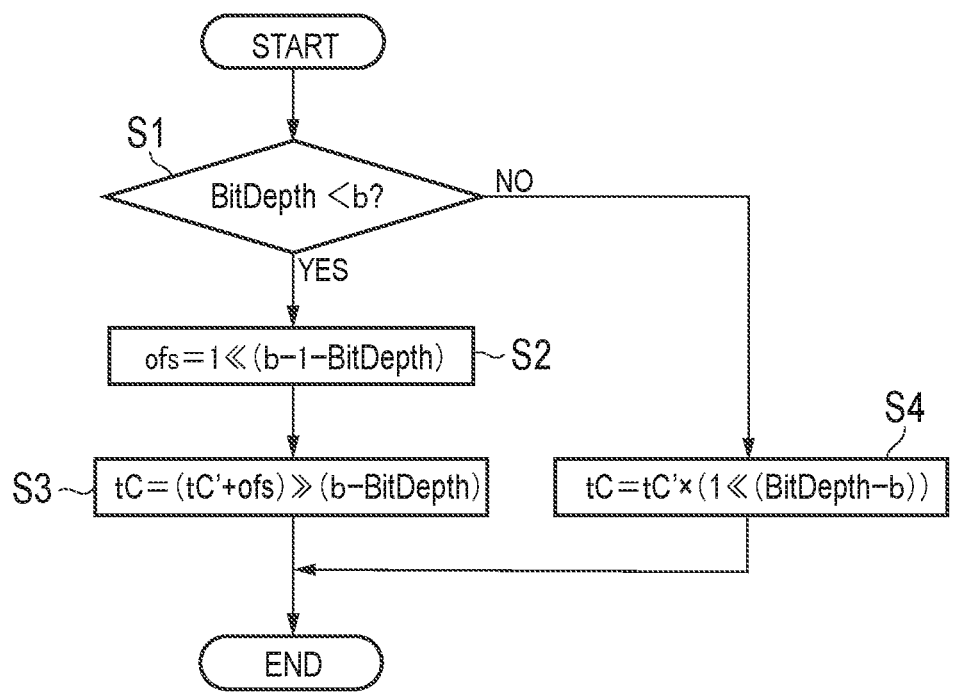
FIG. 3 is a diagram illustrating operation of a parameter transformer according to the embodiment.

Next, the operation of the parameter transformer 161b according to the present embodiment is described. FIG. 3 is a diagram illustrating the operation of the parameter transformer 161b according to the present embodiment.

As illustrated in FIG. 3, in step S1, the parameter transformer 161b determines whether or not the input bit depth is smaller than the predetermined bit depth. Hereinafter, it is assumed that the parameter value is $t_C'$, the offset value is ofs, the input bit depth is BitDepth, the predetermined bit depth is b, and the transformed parameter value is $t_C$. In the present embodiment, it is assumed that the predetermined bit depth b is 10 bits.

When the input bit depth is smaller than the predetermined bit depth (step S1: YES), in step S2, the parameter transformer 161b calculates the offset value ofs, based on a following expression.

$$ofs=1<<(b-1-\text{BitDepth})$$

In step S3, the parameter transformer 161b calculates the transformed parameter value $t_C$, based on a following expression.

$$t_C=(t_C'+ofs)>>(b-\text{BitDepth})$$

When the input bit depth is equal to or more than the predetermined bit depth (step S1: NO), in step S4, the parameter transformer 161b calculates the transformed parameter value $t_C$, based on a following expression.

$$t_C=t_C'\times(1<<(\text{BitDepth}-b))$$

Next, operation and effects of the deblocking filter control device 161 according to the present embodiment are described.

The transform expression according to Non Patent Literature 1 mentioned above does not take into consideration a case where the input bit depth is 9 bits. When the transform expression according to Non Patent Literature 1 is applied to a 9-bit video signal, a problem arises that appropriate values are not obtained if 2 is added to an original value of $t_C'$ and then a result of the addition is shifted by 1 bit.

As indicated in Table 2, when a smaller value is set as Q (that is, when a quantization step is smaller), the $t_C'$ value is set at 0 because a video includes few quantization errors, so that values are configured not to be corrected when the deblocking filter process is applied. However, with the transform expression according to Non Patent Literature 1, as a result of transformation on a 9-bit video signal, the $t_C$ value after the transformation is 1 due to the process of $$t_C=(t_C'+2)>>1$$

even if $t_C'$ is set at 0. As a result, correction of pixel values through the unintended deblocking filter process occurs, which causes deterioration in the video.

In contrast, according to the present embodiment, a novel concept of the offset value ofs that is changed according to the input bit depth BitDepth is introduced, and $t_C$ after transformation is calculated based on the following expression.

$$t_C=(t_C'+ofs)>>(b-\text{BitDepth})$$

ofs=1<<(b−1−BitDepth)

Thus, the problem as described above can be resolved. Note that when the predetermined bit depth b is 10 bits, $t_C$ after transformation is calculated as in the following expression.

$$t_C=\text{BitDepth}<10?(t_C'+ofs)>>(10-\text{BitDepth}): t_C'\times(1<<(\text{BitDepth}-10))\ ofs=1<<(9-\text{BitDepth})$$

<Decoding Device>

Figure 4:
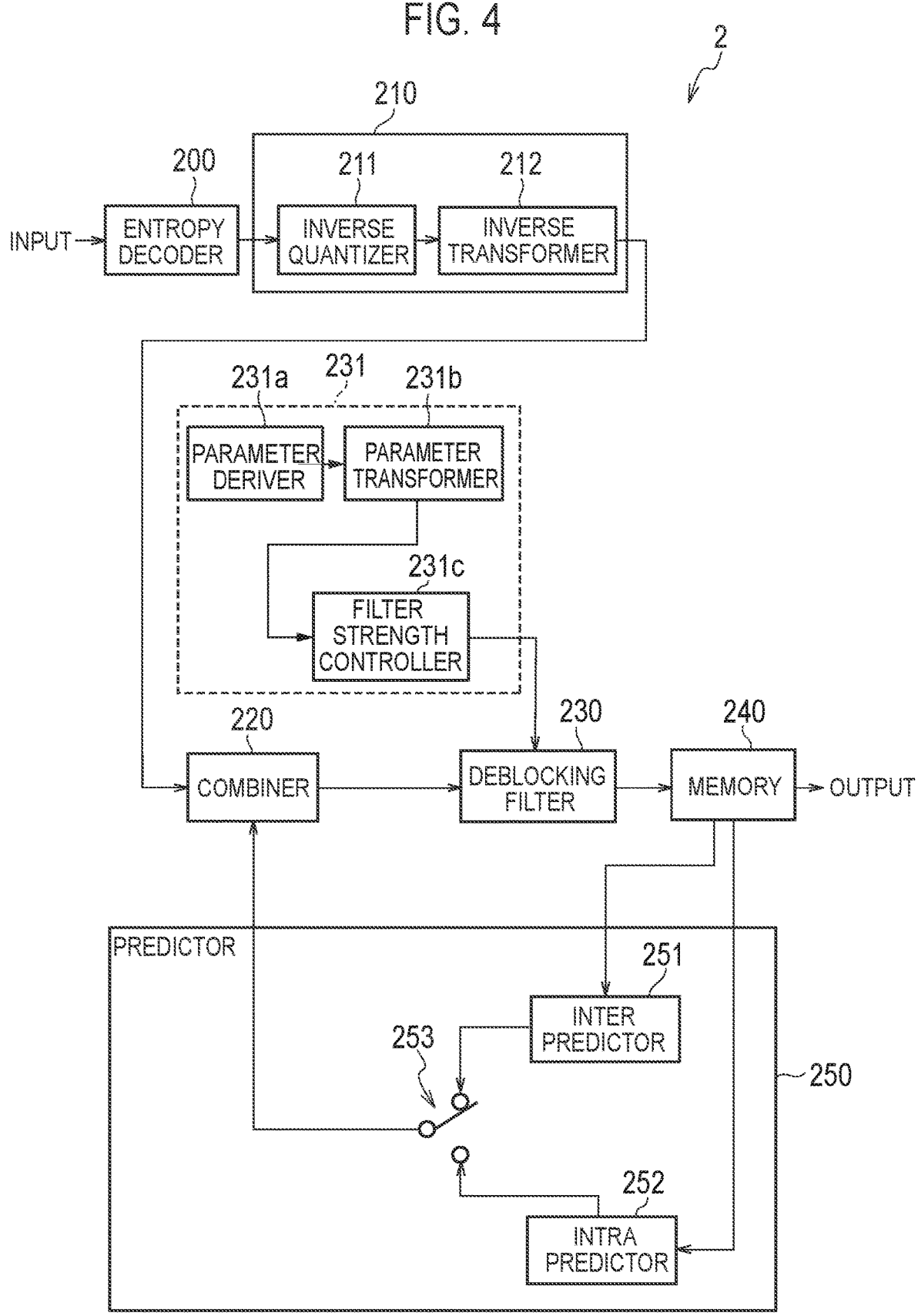
FIG. 4 is a diagram illustrating the configuration of a decoding device according to the embodiment.

Next, a configuration of the decoding device according to the present embodiment is described, focusing mainly on differences from the configuration of the encoding device described above. FIG. 4 is a diagram illustrating the configuration of the decoding device 2 according to the present embodiment. The decoding device 2 is a device that decodes a decoding-target block from an encoded stream.

As illustrated in FIG. 4, the decoding device 2 includes an entropy decoder 200, an inverse quantizer/inverse transformer 210, a combiner 220, a deblocking filter 230, a deblocking filter control device 231, a memory 240, and a predictor 250.

The entropy decoder 200 decodes various signaling information by decoding an encoded stream generated by the encoding device 1. Specifically, the entropy decoder 200 acquires information related to a quantization process has applied to a decoding-target block, and outputs the acquired information to the inverse quantizer 211 and the deblocking filter control device 231. Moreover, the entropy decoder 200 acquires information related to prediction has applied to a decoding-target block (for example, prediction type information, motion vector information), and outputs the acquired information to the predictor 250 and the deblocking filter control device 231.

The entropy decoder 200 decodes the encoded stream, acquires quantized transform coefficients, and outputs the acquired transform coefficients to the inverse quantizer/inverse transformer 210 (inverse quantizer 211).

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse-quantizes the quantized transform coefficients outputted from the entropy decoder 200 by using the quantization parameter and the quantization matrix to restore transform coefficients in the decoding-target block, and outputs the restored transform coefficients to the inverse transformer 212.

The inverse transformer 212 performs an inverse transform process corresponding to the transform process performed by the transformer 121 of the encoding device 1. The inverse transformer 212 restores the prediction residual by performing the inverse transform process on the transform coefficients outputted from the inverse quantizer 211 and outputs the restored prediction residual (restoration prediction residual) to the combiner 220.

The combiner 220 reconstructs (decodes) the decoding-target block by combining the prediction residual outputted from the inverse transformer 212 and a prediction block outputted from the predictor 250 on a pixel-by-pixel basis, and outputs a reconstructed block to the deblocking filter 230.

The deblocking filter 230 performs operation similar to the operation of the deblocking filter 160 of the encoding device 1.

The deblocking filter control device 231 performs operation similar to the operation of the deblocking filter control device 161 of the encoding device 1, based on the information (bit depth information and the like) outputted from the entropy decoder 200. Specifically, the deblocking filter control device 231 includes a parameter deriver 231a, a parameter transformer 231b, and a filter strength controller 231c, similarly to the deblocking filter control device 161 of the encoding device 1. Here, the parameter transformer 231b operates according to the flow in FIG. 3.

The memory 240 stores the reconstructed blocks outputted from the deblocking filter 230 as decoded images in units of frames. The memory 240 outputs the decoded images in units of frames to an outside of the decoding device 2.

The predictor 250 performs prediction in units of blocks. The predictor 250 includes an inter predictor 251, an intra predictor 252 and a switcher 253.

The inter predictor 251 predicts a decoding-target block through inter prediction by using, for a reference image, a decoded image stored in the memory 240. The inter predictor 251 generates an inter prediction block by performing inter prediction, by using the motion vector information outputted from the entropy decoder 200, and outputs the generated inter prediction block to the switcher 253.

The intra predictor 252 references reference pixels adjacent to a decoding-target block of a decoded image stored in the memory 240, and predicts the decoding-target block through intra prediction, based on the information outputted from the entropy decoder 200. The intra predictor 252 generates an intra-prediction block, and outputs the generated intra prediction block to the switcher 253.

The switcher 253 switches the prediction block between the inter prediction block outputted from the inter predictor 251 and the intra prediction block outputted from the intra predictor 252 and outputs one of the prediction blocks to the combiner 220.

OTHER EMBODIMENTS

In the above-described embodiment, different transform expressions may be used between when the input bit depth is 9 bits and other cases. In such a scheme, when the input bit depth is 9 bits, an offset value may be set that is different from an offset value used in the other cases.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. A deblocking filter control device that controls a process in a deblocking filter performed on a decoded image, in an encoding device that encodes a video signal or a decoding device that decodes an encoded video signal, the deblocking filter control device comprising:
   a parameter deriver configured to derive a parameter value ($t_c'$) that controls the process in the deblocking filter; and
   a parameter transformer configured to output a transformed parameter value ($t_c$) by transforming the parameter value ($t_c'$) based on an input bit depth that is a bit depth of the video signal, wherein
   when the input bit depth is smaller than a predetermined bit depth, the parameter transformer is configured to output the transformed parameter value ($t_c$) by adding an offset value to the parameter value ($t_c'$) and making a bit shift of a result of the addition, and
   the parameter transformer is configured to change the offset value based on the input bit depth.

2. The deblocking filter control device according to claim 1, wherein when the input bit depth is smaller than the predetermined bit depth, the parameter transformer is configured to calculate the transformed parameter value based on $$t_C=(t_C'+\textit{ofs})\!>\!>(b-\text{BitDepth}),$$

and to calculate the offset value based on $$\textit{ofs}=1\!<\!<(b-1-\text{BitDepth})$$

where $t_C'$ is the parameter value, ofs is the offset value, BitDepth is the input bit depth, b is the predetermined bit depth, and $t_C$ is the transformed parameter value.

3. The deblocking filter control device according to claim 2, wherein when the input bit depth is equal to or larger than the predetermined bit depth, the parameter transformer is configured to calculate the transformed parameter value ($t_c$) based on $$t_C=t_C'\!\times\!(1\!<\!<(\text{BitDepth}-b)).$$

4. The deblocking filter control device according to claim 1, wherein the predetermined bit depth is 10 bits.

5. The deblocking filter control device according to claim 4, wherein the input bit depth is 9 bits.

6. A non-transitory computer-readable storage medium with an executable program stored thereon, wherein the program causes a computer to function as the deblocking filter control device according to claim 1.

* * * * *